No. 889,781. PATENTED JUNE 2, 1908.
A. B. GRODAES.
GRADER.
APPLICATION FILED SEPT. 30, 1907.
2 SHEETS—SHEET 2.

Inventor
Andrew B. Grodaes
By Victor J. Evans
Attorney

Witnesses

UNITED STATES PATENT OFFICE.

ANDREW B. GRODAES, OF ARTHUR, NORTH DAKOTA.

GRADER.

No. 889,781.            Specification of Letters Patent.            Patented June 2, 1908.

Application filed September 30, 1907. Serial No. 395,237.

*To all whom it may concern:*

Be it known that I, ANDREW B. GRODAES, a citizen of the United States of America, residing at Arthur, in the county of Cass and State of North Dakota, have invented new and useful Improvements in Graders, of which the following is a specification.

This invention relates to road graders, and one of the principal objects of the same is to provide a disk for loosening the earth and throwing it into position to be gathered up by the elevator, said disk being rotated by means of a separate motor supported upon the grading machine.

Another object of the invention is to provide a concavo-convex disk having scalloped edges providing a series of peripheral projections and intermediate grooves, whereby the disk enters the ground and loosens up the earth with the expenditure of less power than would be the case were an ordinary concavo-convex disk used without the projections.

These and other objects may be attained by means of the construction illustrated in the accompanying drawings, in which,—

Figure 1:
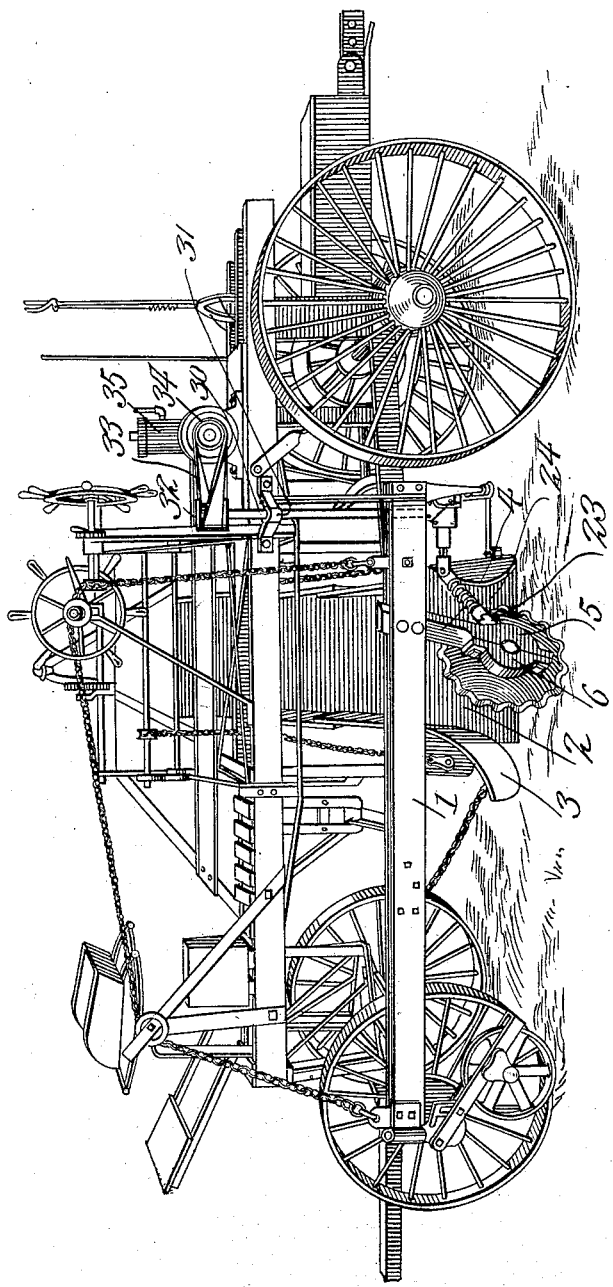
Figure 2:
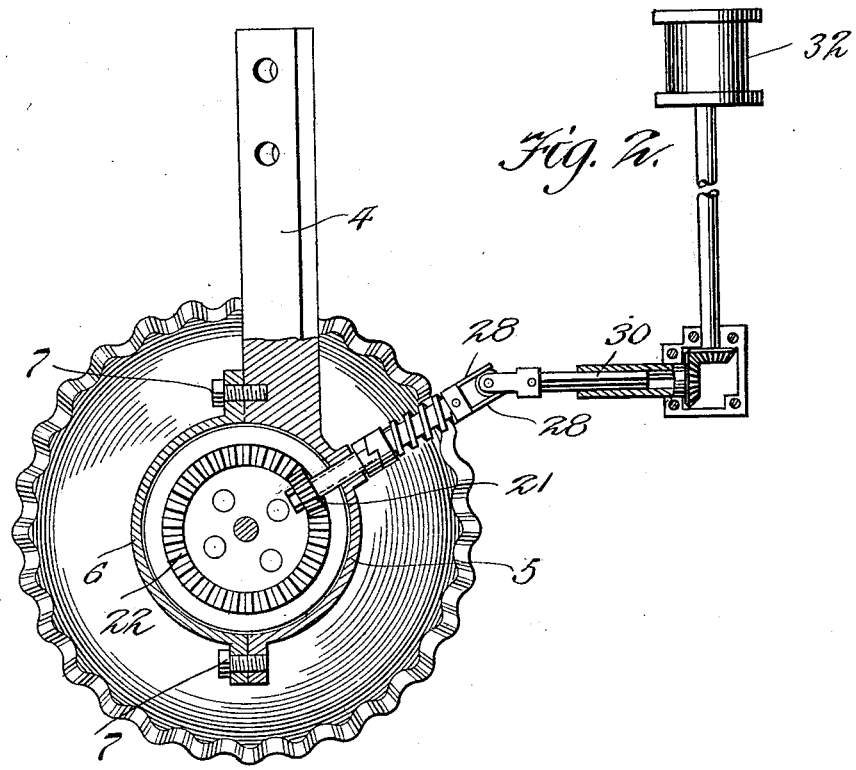
Figure 3:
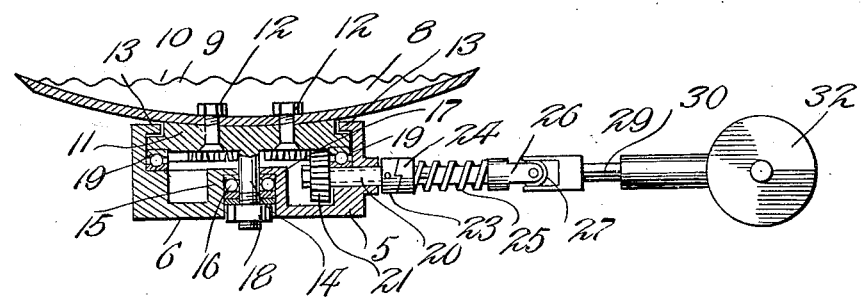

Figure 1 is a perspective view of a grader of usual construction, showing my disk attachment in place thereon. Fig. 2 is a side elevation of the disk and the means for rotating the same. Fig. 3 is a central horizontal section through the disk, said view showing the operative parts.

Referring to the drawings for a more specific description of my invention, the numeral 1 designates the side bars of an ordinary grader provided with an elevator 2 and a guard plate 3. Bolted between the side bars 1 is a standard 4, said standard being provided upon its lower end with a two-part casing 5, 6 secured together by means of bolts 7. A concavo-convex disk 8, provided with a scalloped periphery or having curved projections 9 and intermediate grooves or inwardly curved portions 10, has secured to its convex side a circular bearing plate 11, said plate being secured to the disk by means of screws or bolts 12. The outer periphery of the circular plate 11 is rabbeted, and inwardly projecting flanges 13 on the members 5 and 6 of the casing extend into the rabbeted portion of the plate 11. Formed on the plate 11 is a stub shaft 14 which extends through the boss 15 formed on the members 5 and 6. Within the boss 15 balls 16 are provided, said balls bearing against oppositely disposed washers 17. A nut 18 applied to the outer end of the stub shaft securely holds the balls in position. A ball bearing 19 is also provided for the bearing plate 11.

Projecting through an opening in the section 5 of the casing is a stub shaft 20, said shaft having upon its inner end a gear wheel 21, which engages an annular series of teeth 22 on the bearing plate *k k*. On the stub shaft 20 is a clutch member 23, and slidably mounted on the shaft 20 is a clutch member 24 backed by a spring 25. A swiveled link 26 is secured to the outer end of the shaft 20, and a roller 27 connected to the oppositely disposed arm 28 of the link 26 is pivoted to a similar link 29 formed on the end of a squared shaft 30. The shaft 30 is journaled in a bearing 31 on the grader frame, and carried by said shaft is a pulley 32, around which a belt passes, said belt passing around a pulley 34 on the main shaft of the motor 35.

From the foregoing it will be obvious that the scalloped disk will be rotated in one direction by means of the motor 35, the clutch members 23 and 24 being then engaged. Should the shaft 30 be rotated in the opposite direction the disk would not rotate, as the faces of the members 23 and 24 would rotate one on the other.

My invention is comparatively simple in construction and operates efficiently to loosen the dirt and convey the same to a position to be carried up the elevator.

Without desiring to be limited as to the use of my disk upon a grader, as I am aware that the disk is capable of other uses, the appended claims will not be restricted to the use of the disk with a grader.

Having thus described the invention, what is claimed as new is:—

1. In a grader, the combination of a concavo-convex disk having a scalloped periphery, said disk being mounted upon the frame of the machine, a motor mounted on the frame of the machine, and means for rotating said disk.

2. In combination with a grader provided with an elevator, a disk having a scalloped periphery, means for mounting said disk at the side of the elevator, and means for rotating said disk, substantially as described.

In testimony whereof I affix my signature in presence of two witnesses.

ANDREW B. GRODAES.

Witnesses:
     W. J. COURTNEY,
     W. LORSHBAUGH.